UNITED STATES PATENT OFFICE.

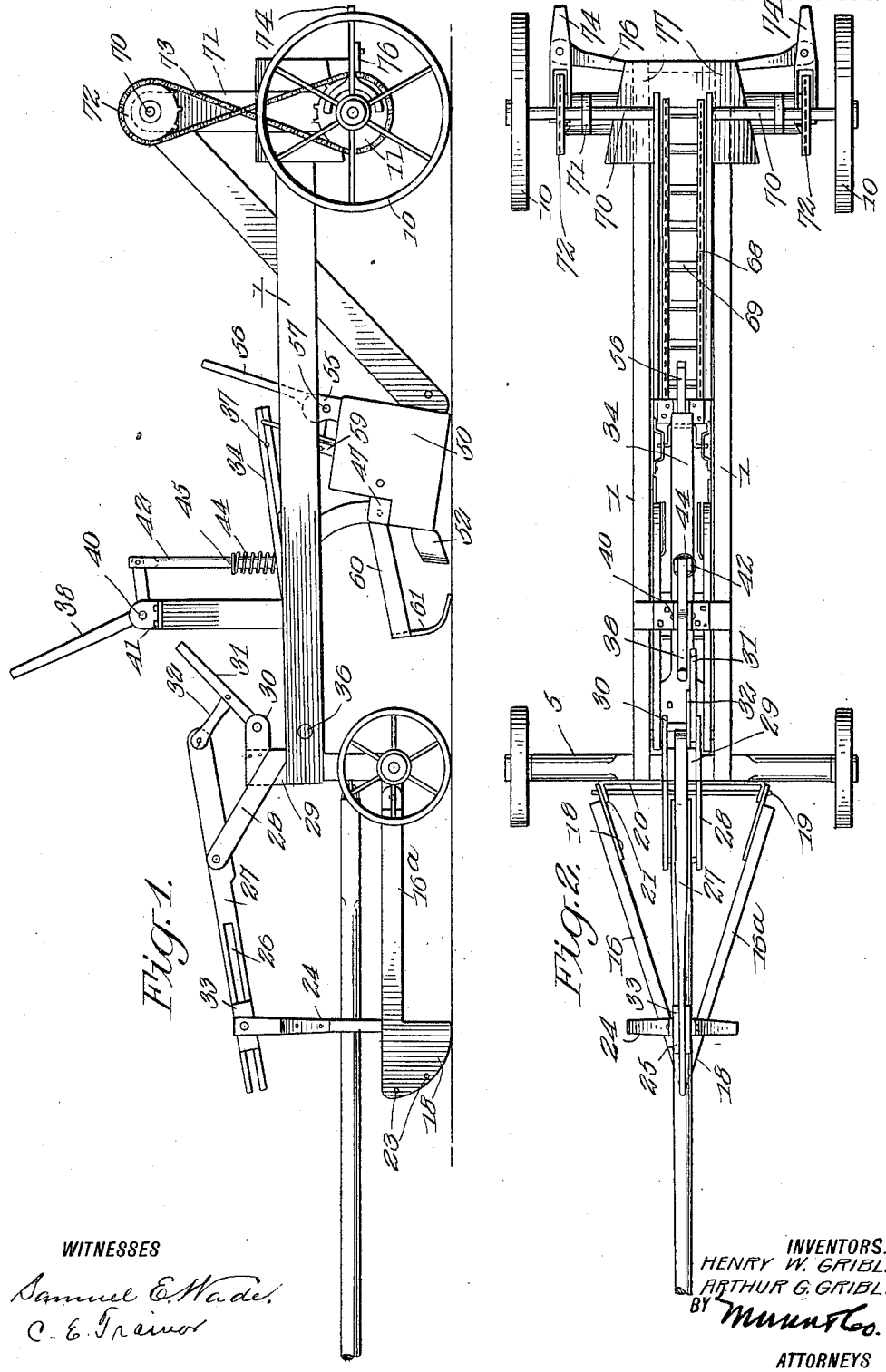

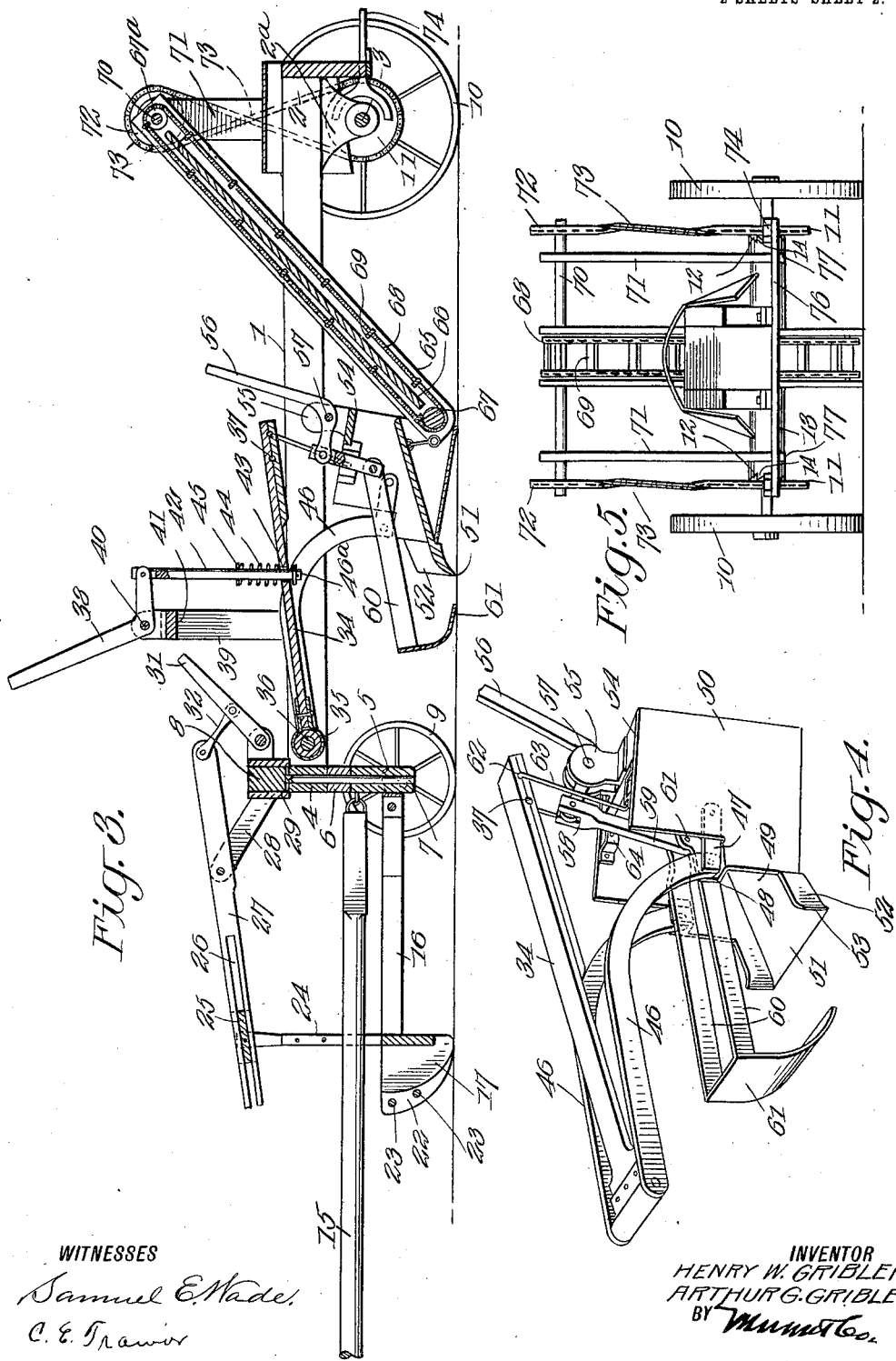

HENRY W. GRIBLER AND ARTHUR G. GRIBLER, OF VAN WERT, OHIO.

DITCHING-MACHINE.

1,029,498. Specification of Letters Patent. Patented June 11, 1912.

Application filed December 22, 1911. Serial No. 667,269.

*To all whom it may concern:*

Be it known that we, HENRY W. GRIBLER and ARTHUR G. GRIBLER, citizens of the United States, residing at Van Wert, in the county of Van Wert and State of Ohio, have invented a new and useful Improvement in Ditching-Machines, of which the following is a specification.

Our invention is an improvement in ditching machines, and has for its object, the provision of a simple, inexpensive, easily operated device of the character specified, which will remove the soil by layers, until the ditch is completed, and which will be entirely automatic in its action, and wherein a guiding means is provided for constraining the machine to follow the ditch.

In the drawings, Figure 1 is a side view of the improvement. Fig. 2 is a plan view. Fig. 3 is a longitudinal vertical section. Fig. 4 is a perspective view of the scraper and deflector, and Fig. 5 is a rear view.

In the present embodiment of the invention, a frame is provided, composed of spaced parallel bars 1, connected at their rear ends by a cross bar 2, and a bearing block 2ª is secured to the rear end of each bar 1, in which the rear axle 3 is journaled. The front ends of the bars are connected by a cross bar 4, and the bar 4 is supported by the front axle 5. A block 6 is seated on the axle, below bar 4, and a pin 7, provided with a head 8, is passed through the bar 4, block 6 and the axle, to connect the parts. The pin 7 is shown elevated in the drawing to more clearly differentiate the parts. Wheels 9 are journaled on the front axle, and wheels 10 of greater diameter than wheels 9 are journaled on the rear axle. Each wheel 10 has a sprocket wheel 11 secured to its hub, and the inner end of the hub is provided with clutch teeth 12. A sleeve 13 is arranged on each end of the rear axle, and each sleeve has its outer end provided with clutch teeth 14. The teeth are so arranged that when the wheels move forwardly, with the clutches in active position, the sleeves are rotated with the wheels, but when the wheels run rearwardly the sleeves are released.

A tongue 15 is connected to the front axle, and a triangular guide frame is connected to the axle below the tongue. The said frame is composed of two bars 16 and 16ª, converging toward their front ends, and connected by a rear bar 17. The rear ends of the bars are secured to plates 18, and each plate is pivoted on the end of a rod 19, supported by a plate 20 secured to the front axle, and having at each end an angular portion 21, having an opening, for the rod.

The marker or guide is substantially right angled, the hypotenuse being convex and arranged at the front. The front ends of the bars 16—16ª are enlarged downwardly to form the guide, and the enlarged portions are beveled at the front edges of their inner faces, as indicated at 22 in Fig. 3, and bolted together by bolts 23. A standard 24 is secured to the inner face of each enlarged portion, and the upper ends of the standards are connected by a plate 25. Each standard is arched outwardly intermediate its ends, and the plate 25 is slidable in a slot 26, in a bar 27, supported by a pair of braces 28. The braces are pivoted to the opposite sides of the bar at one end and intermediate the ends of the bar, and at their other ends they are secured to the opposite sides of a box 29 on the cross bar 4. The box is hollow, and the head 8 of the pin 7 is recessed in the upper end thereof, the said head being rectangular in cross section. The box is provided with a pair of rearwardly extending lugs 30, and a lever 31 is pivoted between the lugs. A link 32 has one end connected to the rear end of the bar 27, and the other to the lever intermediate its ends. By means of the lever the bar 27 may be moved longitudinally. When the bar is moved rearwardly, the front end thereof is lifted, lifting also the marker. The marker may thus be adjusted as desired. The plate 25 has oppositely extending flanges 33 at each side, to prevent lateral movement of the plate in the slot.

A plate 34 is provided at its front end with a bearing 35, which is journaled on a cross pin 36, connecting the bars 1, near the cross bar 4, and the plate is movable vertically between the bars on the pin. At its rear end the plate is provided with a series of spaced transverse openings 37, and an elbow lever 38 is provided for swinging the plate. The lever is pivoted between a pair of uprights 39 on the bars 1, and connected below the pin 40, on which the elbow lever is supported, by a cross bar 41. A link 42 is pivoted to the short arm of the elbow lever, and passes at its lower end through an opening 43 in plate 34. A spring 44 encircles the link between the plate and a cross pin 45, and a pin 46ª engages the link below the plate. The spring acts normally to hold the plate depressed, but also cushions the plate from jar when it is moved upwardly. An arched arm 46 is journaled at its front end on the pin 35, at each end of the plate, and each bar extends rearwardly and downwardly, to a pivotal connection between the front end of a bar 47 and an inwardly offset lug 48 on the scraper to be described. The rear end of the bar 47 is secured to the scraper.

The scraper is of substantially U-shape consisting of a bottom 49 and sides 50. The bottom is extended forwardly at 51 to form a cutter, and the said bottom and cutter are inclined with respect to the sides, from the rear to the front, (Fig. 3). Each end of the extension 51 is flanged upwardly at 52, the rear ends of the flanges being continuous with the sides, and the front end of each flange is flared outwardly, as indicated at 53. A cross plate 54 connects the tops of the sides at the rear, and a pair of spaced lugs 55 is secured to the plate. An elbow lever 56 is pivoted between the lugs on a pin 57, and one arm of the lever is pivoted in a fork 58 on a link 59. The other end of the link is pivoted between the rear ends of a pair of arms 60, on a pin 61. The arms, at their front ends are integral with the upper end of a gage or guide plate 61, in front of the scraper. The said gage is arched forwardly from above downward, and the free edge thereof is spaced away from the cutting edge of the scraper. The gage is for the purpose of preventing the scraper from tipping and also acts to limit the depth to which the scraper enters the soil. The curved edge of the gage engages the bottom of the ditch and slips along the same, and it will be evident that the scraper cannot enter the soil lower than a depth determined by the position of the curved edge of the gage. The gage is adjusted a predetermined vertical distance above the cutting edge of the scraper.

A yoke shaped link has its body portion 62 journaled in one of the openings 37, and its arm 63 pivoted to brackets 64 on the inner faces of the sides of the scraper, at the top thereof, and at approximately the centers of the upper edges. By means of elbow lever 38, the scraper may be raised or lowered, and the spring 44, permits the scraper to yield when striking an obstruction, as for instance a rock.

The scraper delivers to an elevator composed of side plates 65 connected by a floor 66. Rollers 67 and 67ª are journaled between the plates at the ends of the floor, and a conveyer belt is supported on the rollers, with one run on each face of the floor. The belt is composed of chains 68, connected by transverse slats 69, and the upper roller 67ª is secured to a shaft 70 extended at both ends beyond the side plates. The shaft is journaled in uprights 71 on the sleeves 13, and a sprocket wheel 72 is secured to each end of the shaft outside of the uprights.

The wheels 72 and 11 are connected by sprocket chains 73, and the said wheels 11 are movable longitudinally of the axle, and are journaled loosely thereon. The said wheels 11 are shifted by means of the levers 74, each lever engaging opposite sides of the wheel at one end, and being pivoted intermediate its ends to the adjacent end of a bar 76 supported by brackets 77 behind the axle. By means of the levers, the clutch portions on the wheels 11 may be engaged with the clutch portions at the ends of the sleeves 13 to connect the shaft 70 with the axle. The plate 61 is a guide for limiting the depth of the cut of the scraper. It will be evident that when the lower edge of the plate is in engagement with the ground, the depth of the cut made by the scraper will depend upon the distance the edge of the scraper is below the said plate. Since the plate 61 is adjustable with respect to the scraper, the depth of the cut made by the scraper can be limited exactly.

We claim,

1. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, a gage in front of the scraper for limiting the depth of the cut of the scraper, an endless conveyer behind the scraper for receiving the soil and delivering it from the machine, a guiding device in front of the frame for engaging and following the ditch, means for raising and lowering the said device, arms connected to the gage at one end and pivoted to the scraper at the other end, and means connected with the arms for moving the gage.

2. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, a gage in front of the scraper for limiting the depth of the cut of the scraper, an endless conveyer behind the scraper for receiving the soil and delivering it from the machine, a guiding device in front of the frame for engaging and following the ditch, means for raising and lowering the said device.

3. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, a gage in front of the scraper for limiting the depth of the cut of the scraper, an endless conveyer behind the scraper for receiving the soil and delivering it from the machine, and a guiding device in front of the frame for engaging and following the ditch.

4. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, a gage in front of the scraper for limiting the depth of the cut of the scraper, and an endless conveyer behind the scraper for receiving the soil and delivering it from the machine.

5. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, a gage in front of the scraper for limiting the depth of the cut of the scraper, and means for adjusting the gage with respect to the scraper.

6. A machine of the character specified, comprising a wheel supported open frame, a plate pivoted in the frame at the front end thereof, a scraper suspended from the rear end of the plate, means for raising or lowering the rear end of the plate, a yielding connection between the said means and the scraper to permit the scraper to yield upwardly, and a gage in front of the scraper for limiting the depth of the cut of the scraper.

7. In a ditching machine, a wheel supported frame, a scraper, a plate pivoted at one end to the frame near the front thereof, a bail connecting the scraper to the rear end of the plate, said scraper being composed of a bottom having a cutting edge at its front and sides extending upwardly from the bottom, and means for raising and lowering the rear end of the plate, said means comprising spaced uprights on the frame, an elbow lever pivoted between the uprights, a rod pivoted to one arm of the lever, the plate having an opening for the rod, a pin traversing the rod below the plate, a spring encircling the rod above the plate, and a pin traversing the rod against which the upper end of the spring bears.

8. In a ditching machine, a wheel supported frame, a scraper, a plate pivoted at one end to the frame near the front thereof, a bail connecting the scraper to the rear end of the plate, said scraper being composed of a bottom having a cutting edge at its front and sides extending upwardly from the bottom, and means for raising and lowering the rear end of the plate, said means comprising spaced uprights on the frame, an elbow lever pivoted between the uprights, a link pivoted to one arm of the lever, and having a sliding connection with the plate, and a spring arranged above the plate between the plate and the link.

9. In a ditching machine, a wheel supported frame, a scraper, a plate pivoted at one end to the frame near the front thereof, a bail connecting the scraper to the rear end of the plate, and means for raising and lowering the rear end of the plate, said means comprising spaced uprights on the frame, an elbow lever pivoted between the uprights, a rod pivoted to one arm of the lever, a sliding connection between the rod and the plate, and a spring normally pressing the plate downwardly.

10. In a ditching machine, a wheel supported frame, a scraper, a plate pivoted at one end to the frame near the front thereof, a bail connecting the scraper to the rear end of the plate, and means for raising and lowering the rear end of the plate, said means comprising spaced uprights on the frame, an elbow lever pivoted between the uprights, a rod pivoted to one arm of the lever, the plate having an opening for the rod, a stop on the rod below the plate, a spring encircling the rod above the plate, and a pin traversing the rod against which the upper end of the spring bears.

11. In a ditching machine, a scraper composed of a bottom having a cutting edge at its front and sides extending upwardly from the bottom, a guiding plate arranged in front of the scraper, said plate being arched forwardly from above downward, arms connected to each side of the plate at its upper edge, an elbow lever pivoted between the sides of the scraper, a pivoted connection between one arm of the elbow lever and the arms of the plate, a wheeled supporting frame, a plate pivoted at one end on the frame, a swinging connection between the rear end of the plate and the sides of the scraper, means on the frame for raising and lowering the rear end of the plate, and a spring normally pressing the plate downwardly.

12. In a ditching machine, a scraper composed of a bottom having a cutting edge at its front and sides extending upwardly from the bottom, a guiding plate arranged in front of the scraper, said plate being arched forwardly from above downward, arms connected to each side of the plate at its upper edge, an elbow lever pivoted between the sides of the scraper, a pivoted connection between one arm of the elbow lever and the arms of the plate, a wheeled supporting frame, means for supporting the scraper below the frame, means for raising and lowering the scraper, and a spring normally pressing the scraper downward.

13. In a ditching machine, a scraper composed of a bottom having a cutting edge at its front and sides extending upwardly from the bottom, a guiding plate arranged in front of the scraper, said plate being arched forwardly from above downward, arms connected to each side of the plate at its upper edge, an elbow lever pivoted between the sides of the scraper, a pivotal connection between one arm of the elbow lever and the arms of the plate, means for supporting the scraper, and means for adjusting the scraper vertically.

14. In a ditching machine, a scraper composed of a bottom having a cutting edge at its front and sides extending upwardly from the bottom, a guiding plate arranged in front of the scraper, said plate being arched forwardly from above downward, arms connected to each side of the plate at its upper edge, an elbow lever pivoted between the sides of the scraper, a pivotal connection between one arm of the elbow lever and the arms of the plate.

15. In a ditching machine, a scraper composed of a bottom having a cutting edge at its front and sides extending upwardly from the bottom, a guiding plate arranged in front of the scraper, said plate being arched forwardly from above downward, arms connected to each side of the plate at its upper edge, and means on the scraper engaging the arms for adjusting the plate with respect to the scraper.

16. In a ditching machine, a main frame, a rear axle secured to the rear end of the frame, a front axle mounted to swing at the front of the frame, wheels on the axles, a scraper supported by the frame, and means connected to the front axle and engaging the ditch for guiding the frame, said means comprising a substantially triangular frame having its lower front corner rounded for engaging the ditch, bars connected to the frame and extending rearwardly, said bars diverging toward their rear ends, each of the said rear ends being pivoted to the front axle near the end thereof, and means for raising and lowering the guiding frame, said means comprising a bar extending forwardly from the main frame above the guiding frame, said bar having a transverse longitudinal slot at its front end, a slide in the slot, a connection between the slide and the guiding frame for constraining the frame and the slide to move together, and means on the main frame for raising and lowering the bar.

17. In a ditching machine, a main frame, a rear axle secured to the rear end of the frame, a front axle mounted to swing at the front of the frame, wheels on the axles, a scraper supported by the frame, and means connected to the front axle and engaging the ditch for guiding the frame, said means comprising a substantially triangular frame having its lower front corner mounted for engaging the ditch, bars connected to the frame and extending rearwardly, said bars diverging toward their rear ends, each of the said rear ends being pivoted to the front axle near the end thereof, and means for raising and lowering the guiding frame.

HENRY W. GRIBLER.
ARTHUR G. GRIBLER.

Witnesses:
A. C. SHEETS,
ALMA E. HALL.

Copies of this patent may be obtained for five cents each, by addressing the "Commissioner of Patents. Washington, D. C."